Oct. 14, 1969  W. H. SHINER  3,473,144

LASER APPARATUS AND GLASS COMPOSITION

Filed Nov. 1, 1965  3 Sheets-Sheet 1

SODA LIME GLASS WITH $Sb_2O_3$

SODA LIME GLASS WITHOUT $Sb_2O_3$

INVENTOR.
WILLIAM H. SHINER
BY
Stanley J. Yarner
ATTORNEY

THE EFFECT OF $Sb_2O_3$, $TiO_2$ AND $CeO_2$ ON THE SOLARIZATION OF A POTASSIUM-BARIUM-SILICATE GLASS. THE SOLARIZED CURVE IS THE LOWER ONE IN EACH CASE.

Oct. 14, 1969 W. H. SHINER 3,473,144
LASER APPARATUS AND GLASS COMPOSITION
Filed Nov. 1, 1965

INVENTOR.
WILLIAM H. SHINER 3,473,144
LASER APPARATUS AND GLASS COMPOSITION
William H. Shiner, Auburn, Mass., assignor, by mesne assignments, to American Optical Corporation, a corporation of Delaware
Filed Nov. 1, 1965, Ser. No. 505,893
Int. Cl. H01s 3/02
U.S. Cl. 331—94.5                    15 Claims

ABSTRACT OF THE DISCLOSURE

A self-Q-switching laser apparatus is provided. The apparatus contains a laserable glass material with a composition chosen to solarize in the part of the wavelength spectrum at which the laser emits so as to form color centers. The color centers are opaque and limit the bidirectional reflection of light until said laser apparatus produces light of enough intensity to saturate the absorption of said color centers.

---

This invention relates generally to lasers, and particularly to a simple means for Q-switching a laser device in an efficient manner. More specifically, the invention relates to resonant laser structures wherein the ratio of wave energy storage to wave energy dissipation per wave energy cycle (Q) is shiftable from a low value to a high value at a time after the laser material in the structure has been energized to establish a high inversion of energy states thereof.

Lasers (an acronym for "light amplification by the stimulated emission of radiation"), sometimes referred to as optical masers, are light-amplifying devices and are specifically adapted to produce high intensity pulses of coherent, monochromatic light concentrated in an extremely narrow beam. They find use in diverse fields as sources of light energy; being employed to deliver light energy in intense and highly concentrated form to a relatively small target area.

Light is produced in a laser by photonic emission from the active atoms of a body composed of a so-called laser material. This emission occurs incident to the transition of the atoms from an excited higher energy level to a lower energy level. Accordingly, laser operation essentially involves exciting active atoms in the laser body to such higher energy level, and inducing the emissive transition of the excited atoms in a manner controlled to utilize the light thereby emitted to provide the desired laser output pulse. The nature and number of interlevel transitions which must be effected in a complete atomic cycle of laser operation are dependent upon the properties of the particular laser material used.

By way of example, one form of laser structure includes a rod-shaped body composed of a suitable solid laser material, such as synthetic crystalline ruby or an organic or inorganic glass having an activator ion, surrounded concentrically by a helical gaseous discharge tube (commonly called a flash tube), or proximate a cylindrical flash tube, which is adapted to emit a pulse of light specifically including light in the wavelength of an absorption band of the laser material. When the flash tube is activated, the light generated thereby enters the transmissive laser rod, "pumping" the body with energy of such wavelength. This pumping excites active atoms in the laser body to shift from an initial low energy level in a series of interlevel transitions, typically involving a first energy-absorptive transition to a very unstable high energy level, and an immediately subsequent spontaneous transition (wtih release of heat and not light energy, but presently regarded as nonemissive) from this unstable level to the somewhat more stable high energy level intermediate in energy between the aforementioned initial and unstable levels, and from which light-emissive transition occurs. Thus, the pumping pulse from the flash tube provides the excitation step in laser operation, creating a very large population of atoms at the higher energy levels in the laser body. The establishment of this large high level population in the intermediate level as to a lower level is referred to as an inversion of energy states of the body and once established, the laser body is considered to be in a "negative temperature" distribution state.

For effecting induced light-emissive transition from the intermediate level to complete the atomic cycle of laser operation, the laser body of the structure is usually disposed coaxially within a resonant cavity defined between opposed internally reflective cavity ends. Immediately upon the inversion of energy states of the body to a negative temperature distribution, individual atoms at the intermediate energy level begin to undergo emissive transitions spontaneously, shifting to a terminal low energy level (which may or may not be the initial low energy level, depending upon the nature of the laser material) with concomitant emission of light. Since this intermediate level is relatively stable, compared to the high energy level in a laser material, such spontaneous emissions would deplete the enlarged intermediate level population at a comparatively slow rate. However, a portion of the light emitted by the spontaneously emitting atoms passes through the resonant cavity to the ends thereof, and is then reflected back and forth between the ends, passing and repassing in multiple bidirectional reflections. This bidirectionally reflected light excites other atoms at the intermediate energy level in such a manner as to induce them to undergo emissive transition to the terminal level, producing more light (and depleting the intermediate level population), which augments the bidirectionally reflected light, to induce still further emissive transitions from the intermediate energy level. In this way, a rising pulse of bidirectionally reflected light quickly develops within the cavity, reaching a quantitatively large value as the induced emissive transitions of atoms from the intermediate level become massive. Light of high intensity is, accordingly, created in one or a succession of light pulses while the pumping light is present, the action continuing until depletion of the intermediate level population by such transitions restores the laser body to a normal energy state or continuing as long as the pump light continues to restore the intermediate population. To permit emission of a portion of the large bidirectionally reflected light pulse or pulses from the laser cavity, one reflective end of the cavity is made partially transmissive. The fraction of the bidirectionally reflected light escaping therethrough constitutes the laser output. Other features of a laser become apparent by reference to copending U.S. patent application Ser. No. 168,012, for "Glass Laser," by Elias Snitzer, inventor, filed Jan. 16, 1962, and similarly assigned to American Optical Company.

In laser operation as described above, the energy pumping pulse is of finite duration and excitation of atoms to the higher energy levels occurs throughout this finite period. However, with a laser cavity maintained internally reflective at both ends, light emitted by spontaneous emission from atoms in the intermediate level population begins to reflect back and forth in the cavity and, in so doing, induces emissive transitions of other intermediate level atoms in significant number at a so-called threshold point, which is reached before the end of the pumping period. Thus, for a considerable portion of the pumping period, the effect of the pumping pulse in augmenting the intermediate level population is offset by the depletion of that population due to induced transitions, with the result that the magnitude of the intermediate level population state levels off prematurely at a plateau.

Therefore, the same pumping pulse could create a significantly larger maximum intermediate level population in the laser body if the transition inducement created by multiple light reflections could be retarded until a later time in the pumping period. Such delay of the latter state would be desirable because the magnitude of the peak power attained by the laser output pulse is directly related to the magnitude of this maximum intermediate level population; and it is often regarded as very desirable to obtain as large a peak power output as possible for optimum laser utility. In other words, the prevention of premature bidirectional light reflections, thereby allowing development of a larger intermediate level population, would enable attainment of peak power output greater than that produced with the above-described laser operation.

It has been found that the multiple bidirectional reflections of spontaneously emitted light can be delayed in the desired manner by a technique referred to as "Q-switching." (See Advances in Quantum Electronics, edited by Singer, particularly the article "Control of Fluorescent Pulsations," by R. W. Hellwarth, Columbia University Press, 1961.) The Q, or quality factor, of the laser resonant cavity is proportional to the ratio of wave energy storage to wave energy dissipation per cycle therein. When one end of the cavity-provided structure is nonreflective, the resultant structure is said to be in a low Q condition, because light emitted by the spontaneous transitions of higher level atoms in the laser body cannot reflect back and forth to augment the depletion of the intermediate level population, but is instead dissipated at the nonreflective end after a maximum of two passes through the structure. The Q-switching operation involves maintaining the cavity-providing structure in a low Q condition during that portion of the pumping pulse required for the intermediate level population to reach a maximum value (which is substantially larger than the plateau value obtained in laser threshold operation as described above). Then, at a time approximating the moment of maximum inversion, if a previously non-reflective end of the cavity structure is caused to become reflective, the laser is switched to a so-called high Q condition. Multiple bidirectional reflection of light produced by spontaneous emission in the laser body begins immediately upon such switching, and quickly rises by induced emission from atoms in the very large intermediate level population previously established. The resultant laser output pulse is much faster in rise time, and greater in peak power than the pulse produced in threshold laser operation.

This so-called "Q-switching" is usually performed by external means such as that disclosed in copending U.S. patent application Ser. No. 392,520, for "Q-Switching of Lasers," by George R. Simpson, inventor, filed Aug. 27, 1964, and similarly assigned to American Optical Company. Such apparatus as disclosed therein is quite useful for those situations where precise timing of Q-switching (after the laserable inversion is established) is a necessary prerequisite. However, there are some applications of Q-switching wherein timing is not as essential and therefore the complexity of mechanical Q-switching devices is not needed.

Accordingly, a primary object of the present invention is to provide laser Q-switching apparatus wherein Q-switching is accomplished without the necessity for moving parts.

This and other such objects are accomplished in one illustrative embodiment of the invention wherein the composition of the laser material is adjusted to provide self-Q-switching.

Other objects, embodiments and features of the present invention will be apparent from the following more detailed description and reference to the accompanying drawings wherein.

The phenomenon of solarization in a glass material is characterized by its increase in absorbance. The increased absorption due to solarization is caused by the formation of color centers which consist of displaced electrons that are trapped in regions of positive charge (F-centers, in solid state terms). Counteraction of the solarization may be accomplished by high intensity light such as laser light wherein photons are supplied to lift the energy level of about half of the electrons in the positive traps to the intermediate energy level to thereby establish a saturation of the absorption since the absorption or coloring involves a process of lifting the energy level of electrons to the intermediate or a higher level. By placing the energy level of about half of the electrons at the intermediate state, this absorption can be counteracted or saturated; that is, for every transition from the lower to the higher levels, there is enough population at the intermediate level to cause a downward transition of about the same magnitude. The color centers still exist (the glass is still solarized) but the solarization phenomenon is negated by the so-called "saturation of the absorption." Solarization, or the trapping of electrons in the said positive traps, is usually caused by high intensity ultraviolet light. When laser glass, for instance, is made, the constituents are usually characterized by the presence of a so-called antisolarization element such as antimony, titanium, cerium, etc. For instance, the addition of antimony ($Sb_2O_3$) is almost universally included in laser glass in order to provide a bubbling agent (NaCl can be used in its place or a fining agent or bubbling agent may be omitted in a non-vitreous glass or in the presence of a nitrogen atmosphere), but it also incidentally provides a cutoff of ultraviolet pumping light to thereby prevent solarization in the laser glass, especially at the red and infrared wavelengths where laser emission occurs. What has been said above is regard to color centers formed by electrons trapped in regions of positive charge applies equally well to a "hole" or the region of electron deficiency which behaves like a "negative electron" or "positive hole," which can be trapped or localized in well-defined sites and which can impart color to the material.

Figure 1:
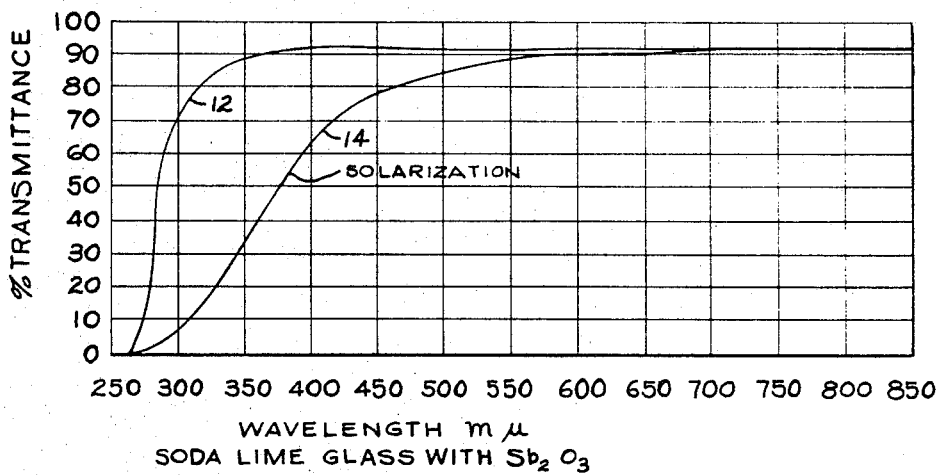
FIG. 1 is a plot of percent transmittance for various wavelengths in a standard base soda-lime glass with $Sb_2O_3$ showing how solarization is prevented in the red and infrared portions of the spectrum by cutting off of ultraviolet light.

The cutting off of ultraviolet is depicted graphically in the plot of FIG. 1 wherein the transmittance of a standard soda-lime base glass, useful in a laser body, is shown as plot 12. With the addition of $Sb_2O_3$ the solarization curve is as shown by plot 14. It may be seen by this graph that the phenomenon of solarization is absorbance or a decrease in transmittance at certain wavelengths. It may also be seen that with the addition of $Sb_2O_3$, the glass does not transmit below about 275 mμ to prevent the propagation of high intensity ultraviolet light, which could cause solarization in the red and infrared regions of the spectrum. With $Sb_2O_3$ in the glass, there is very little solarization beyond about 600 mμ.

Figure 2:
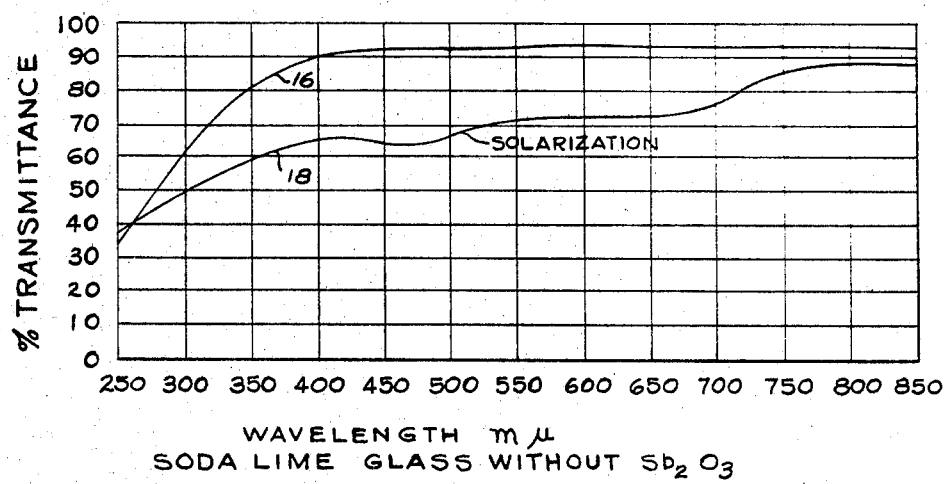
FIG. 2 is a plot of percent transmittance at various wavelengths of the glass used for the plot of FIG. 1 showing how the transmittance of ultraviolet light causes solarization even at the red and infrared portions of the spectrum, this being accomplished by the omission of $SB_2O_3$ from the glass.

FIG. 2 shows the solarization phenomenon as it occurs when $Sb_2O_3$ is omitted as a constituent of the glass. The transmittance curve 16 is for a soda-lime glass and the solarization curve 18 is also shown. Unlike FIG. 1, there is no cutoff of ultraviolet light so that solarization occurs across a major portion of the spectrum including a small but significant solarization beyond about 750 mμ, which is in the red and infrared regions of the spectrum.

Figure 3:
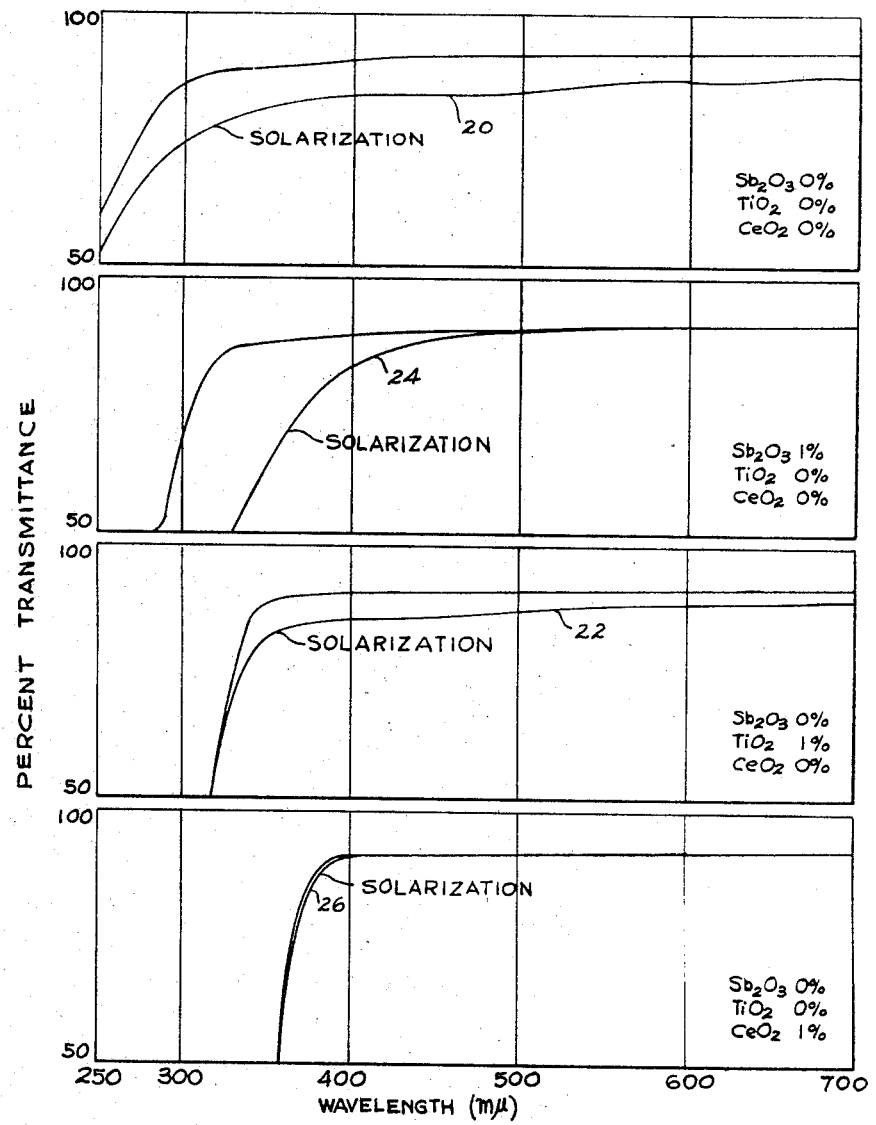
FIGS. 3A–3D are plots of percent transmittance at various wavelengths for a potassium-barium-silicate glass showing the effects of the inclusion and omission of various combinations of $Sb_2O_3$, $TiO_2$ and $CeO_2$ on the solarization of the glass.

Further graphical representations of the effects of certain elements on solarization are shown in FIGS. 3A, 3B, 3C and 3D. It may be seen that solarization in the red and infrared regions of the spectrum is accomplished in FIGS. 3A and 3C by the omission in the glass of $Sb_2O_3$ and $CeO_2$. The solarization curve 20 of FIG. 3A is particularly significant and large, since the graph is characterized by the emission of all three of the desolarizing elements represented. In FIG. 3C the solarization 22 is quite useful for the purposes of the present invention, although somewhat less than that shown in FIG. 3A, since a small weight percent (for instance, one weight percent) of $TiO_2$ has been added to the glass as a desolarizing agent. The plots 24 and 26 for solarization in FIGS. 3B and 3D, respectively, show very little or no solarization in the red and infrared regions of the spectrum, so that for the purposes of the present invention, these combinations of antisolarizing elements added to the base glass of the laser will not accomplish the Q-switching to be described. However, it should be noted that the purposes of the present invention would be satisfied by solarization at a wavelength out of the red and infrared regions, if this is where laser emission occurs.

Figure 4:
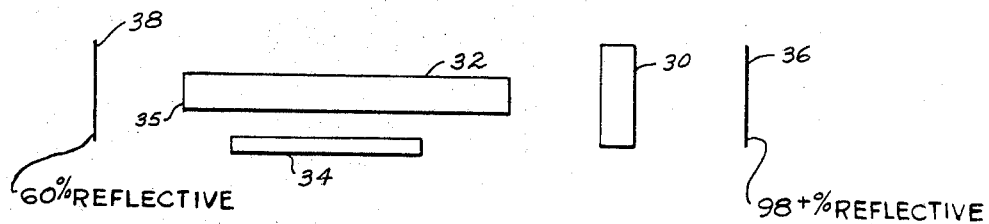
FIG. 4 is a schematic representation of an apparatus according to the invention showing the use of a solarizing cell within the resonant cavity for Q-switching.

If a glass, such as the combination depicted by FIGS. 3A and 3C, is used to form a cell 30, the apparatus according to FIG. 4 will operate as a Q-switching system. In FIG. 4, a laser body 32 is shown with its flash tube 34, disposed within a resonant cavity defined by end reflectors 36 and 38. Solarizing cell 30 is placed between end reflector 36 and the laser rod 32. Before the inversion of the laser body 32 is increased by pumping light from flash tube 34, the cell 30 is solarized by energy from a high intensity ultraviolet source (not shown), since by the omission of such constituents as $Sb_2O_3$ in the cell, the high intensity ultraviolet light will cause electrons to be trapped in the positive traps previously discussed. The cell 30 will then tend to become opaque, limiting the bidirectional reflection of light propagated by the laser. In this way the inversion, and therefore the intensity of laser light, will continue to build up between the intermediate energy level and the ground or terminal level, depending upon the nature of the laser material. Since it is the purpose of the bidirectional reflection of light to deplete the intermediate energy level population, and since the cell 30 is opaque, the inversion will continue to build up until, at some time, the light propagated to cell 30 from the laser rod 32 becomes intense enough to instantaneously "saturate the absorption" of the cell, at which time the laser will switch to a high Q condition and the output will occur all at once by the "dumping" of the ions from the intermediate energy level to the ground or terminal level. The reflectivity of the end plates 36 and 38 is noted on the drawing by way of example only, and it should be understood that other reflectivities are possible and contemplated, depending upon the particular result desired. Apparatus according to this invention has been operated with solarizing plates 20 mm. square and 2 mm. thick, as an example.

Figure 5:
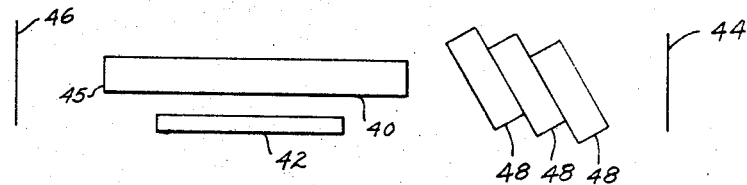
FIG. 5 is a representation similar to that shown in FIG. 4 wherein a number of solarizing cells are used for Q-switching according to the present invention; and, FIG. 6 is a schematic representation of self-Q-switching according to the present invention wherein a laser rod itself is comprised of a solarizing material for the accomplished of Q-switching.

Referring to FIG. 5, a laser apparatus is shown as comprising a laser body 40, flash tube 42, end reflectors 44 and 46, and solarization cells 48. It should be noted that more than one solarization cell 48 (the inventor has operated, for example, with five such cells) is employed in this embodiment to represent the fact that by using more than one cell, the inversion of the laser rod is allowed to build up further before "saturating the absorption" of the solarizing cells; or, in other words, to Q-switch the laser. It should also be noticed that the solarizing cells 48 are placed at an angle in order to prevent unwanted reflections which could serve to defeat the main purpose of this invention by "dumping" the ions in the intermediate level to a lower level to thereby deplete the inversion rather than build it up.

Figure 6:
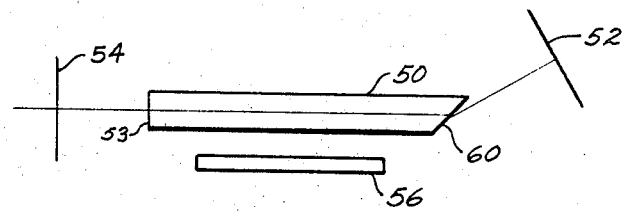

FIG. 6 represents a still further embodiment of the invention wherein a laser rod 50 is disposed within a resonant cavity defined by end reflectors 52 and 54 with its associated flash tube 56. In this configuration, the laser rod itself is comprised of a rare earth-doped base glass characterized by the absence of an antisolarizing agent, such as $Sb_2O_3$. In this way, the laser apparatus may be operated with self-Q-switching. In the same manner as the previously discussed configurations, as to a solarizing cell the laser rod propagates high intensity ultraviolet energy from the pump source 56 or from another source as well as energy in other parts of the spectrum. The high intensity ultraviolet tends to cause solarization of the laser rod 50 in the absence of an antisolarizing additive. The inversion is built up beyond threshold without a "dumping" from the intermediate energy level (laser is in low Q condition), which could be caused by bidirectional reflections of the spontaneously emitted light. The bidirectional reflections are prevented by the opacity or solarization of the laser glass itself. The high Q condition is attained when the light propagated by the laser reaches a high enough intensity to "saturate the absorption" of the laser rod itself. A Brewster angle 60 or other Brewster angle means, such as Brewster angles at both ends of the rod (not shown), may be used to prevent unwanted reflections in the laser cavity in either of the embodiments of FIGS. 4, 5 and 6. It should also be understood that reflectors 54, 46 and 38 may be omitted if ends 53, 45 and 37 of the laser rods in FIGS. 4, 5 and 6 are left flat rather than at a Brewster angle. It should be further understood that where Brewster angles are used at ends 53, 45 and 37, a reflector 54, 46 and 38 will be necessary (this being true at either end of the rod). Also, the apparatus could be used with a Brewster angle end and no reflector.

It should be noted that the inventor has operated laser systems of the type described herein using rods, by way of example only, whose length and diameter are 3″ x ¼″ and 22″ x 6 mm.

Examples of the types of glass compositions and weight percentages useful with the present invention are the following:

|  | I (range) | II (range) | III (range) | IV (range) | V (range) |
|---|---|---|---|---|---|
| $SiO_2$ | 67.44 (55–72) | 68.82 (55–72) | 67.64 (55–72) | 69.14 (55–72) | 68.42 (55–72) |
| $SiO_2$ | 67.44 (55–72) | 68.82 (55–72) | 67.64 (55–72) | 69.14 (55–72) | 68.42 (55–72) |
| $Li_2O$ | 1.00 (0–2) | 1.03 (0–2) | 1.01 (0–2) | | |
| $Na_2O$ | 7.24 (0–15) | 7.38 (0–15) | 7.26 (0–15) | 5.32 (0–15) | 17.06 (0–18) |
| $K_2O$ | 10.96 (0–15) | 11.18 (0–15) | 10.99 (0–15) | 18.09 (0–19) | 2.88 (0–15) |
| $BaO$ | 4.82 (3–12) | 4.92 (3–12) | 4.84 (3–12) | 5.32 (3–12) | |
| $CaO$ | | | | | 7.28 (5–10) |
| $Al_2O_3$ | 1.51 (0–3) | 1.54 (0–3) | 1.51 (0–3) | 2.13 (0–3) | 4.36 (0–5) |
| $ZnO$ | 1.51 (0–6) | | 1.51 (0–6) | | |
| $NaCl$ | | | .20 (.15–.25) | | |
| $Nd_2O_3$ | 5.03 (.01–25) | 5.13 (.01–25) | 5.04 (.01–25) | | |
| $Na_2SO$ | .49 (.3–.6) | | | | |

NOTE.—The summation of the $Na_2O$ and the $K_2O$ should be at least 15 weight percent.

It should be noted that various glasses are useful in the present invention with the following being set forth by way of example only: barium-crown, soda-lime base silicate, aluminum zinc phosphate, sodium borate, high silicate, borosilicate, germanate. It sould also be understood that in the arrangements of FIGS. 4 and 5, the cell may be comprised of any of the glasses previously mentioned or others while the laser may be a glass laser, a crystal laser, a gas laser, or a laser of another type.

Notwithstanding the introductory remarks, it should be understood that it may be possible to attain precise timing control with the present invention by such means as adjusting the number of solarizing cells. It should further be understood that the present invention is useful to cause the laser apparatus to emit a number of spikes, all Q-switched and a very short interval apart.

I claim:

1. A laser self-Q-switching apparatus comprising a pair of reflective surfaces forming an optically resonant cavity, a laser body including a laser material positioned along the axis of said resonant cavity for emitting energy in a part of the wavelength spectrum, said laser material being characterized by a solarizing composition which solorizes in the part of the wavelength spectrum at which said laser body emits to form color centers to maintain said laser material in a low Q condition until said laser material produces light of enough intensity to saturate the absorption of said color centers.

2. The invention according to claim 1 wherein said laser material comprises a barium-crown glass characterized by the absence of an anti-solarizing ingredient.

3. The invention according to claim 1 wherein said laser material comprises a soda-lime base silicate glass characterized by the absence of an antisolarizing ingredient.

4. The invention according to claim 1 wherein said laser material comprises a phosphate glass characterized by the absence of an antisolarizing ingredient.

5. The invention according to claim 1 wherein said laser material comprises a borate glass characterized by the absence of an antisolarizing ingredient.

6. The invention according to claim 1 wherein said laser material comprises a high silicate glass characterized by the absence of an antisolarizing ingredient.

7. The invention according to claim 1 wherein said laser material comprises a borosilicate glass characterized by the absence of an antisolarizing ingredient.

8. The invention according to claim 1 wherein said laser material comprises a germanate glass characterized by the absence of an antisolarizing ingredient.

9. The invention according to claim 1 wherein said laser material comprises a glass consisting of materials in the following approximate weight percent compositions:

|  | Percent |
|---|---|
| $SiO_2$ | 55–72 |
| $Li_2O$ | 0–2 |
| $Na_2O$ | 0–15 |
| $K_2O$ | 0–15 |
| $BaO$ | 3–12 |
| $Al_2O_3$ | 0–3 |
| $Nd_2O_3$ | .01–25 |

10. The invention according to claim 1 wherein said laser material comprises a glass consisting of materials in the following approximate weight percent compositions:

|  | Percent |
|---|---|
| $SiO_2$ | 55–72 |
| $Na_2O$ | 0–15 |
| $K_2O$ | 0–19 |
| $BaO$ | 3–12 |
| $Al_2O_3$ | 0–3 |

11. The invention according to claim 1 wherein said laser material comprises a glass consisting of materials in the following approximate weight percent compositions:

|  | Percent |
|---|---|
| $SiO_2$ | 55–72 |
| $Na_2O$ | 0–18 |
| $K_2O$ | 0–15 |
| $CaO$ | 5–10 |
| $Al_2O_3$ | 0–5 |

12. A laser Q-switching apparatus comprising a resonant cavity having first and second end reflectors, a laser body for producing intense light in a portion of the wavelength spectrum having two ends and disposed between said reflectors along the axis of said resonant cavity, and at least one solarizing cell positioned along the axis of said resonant cavity intermediate said laser body and one of said end reflectors, said cell being characterized by a solarizing material which allows the propagation of ultraviolet energy and thereby solarizes in the portion of the wavelength spectrum at which laser emission occurs to form color centers to maintain said laser body in a low Q condition until said laser body produces light of enough intensity to saturate the absorption of said cell.

13. The invention according to claim 12 wherein said solarizing cell comprises a glass material and said laser comprises a gas material.

14. The invention according to claim 12 wherein said solarizing cell comprises a glass material and said laser comprises a crystalline material.

15. The invention according to claim 12 including a plurality of solarizing cells intermediate said laser body and one of said end reflectors.

References Cited

Melamed et al., Laser Action in Uranyl-Sensitized Nd-Doped Glass, Appl. Phys. Letters, vol. 6, No. 3 (Feb. 1, 1965) pp. 43–45.

JEWELL H. PEDERSEN, Primary Examiner

WILLIAM L. SIKES, Assistant Examiner

U.S. Cl. X.R.

252—301.6; 350—160